United States Patent
Lee et al.

(10) Patent No.: US 7,031,664 B2
(45) Date of Patent: Apr. 18, 2006

(54) MOBILE COMMUNICATION APPARATUS INCLUDING ANTENNA ARRAY AND MOBILE COMMUNICATION METHOD

(75) Inventors: Yong-Suk Lee, Suwon-si (KR); Sung-Jin Kim, Suwon-si (KR); Kwang-Bok Lee, c/o Institute of New Media and Communicaitons, Seoul National University, San 56-1 Shillim-dong, Gwanak-gu, Seoul, 151-742 (KR); Keun-Chul Hwang, Seoul (KR)

(73) Assignees: Samsung Electronics Co., Ltd., Suwon-si (KR); Kwang-Bok Lee, Seoul (KR)

( * ) Notice: Subject to any disclaimer, the term of this patent is extended or adjusted under 35 U.S.C. 154(b) by 11 days.

(21) Appl. No.: 10/505,559

(22) PCT Filed: Feb. 17, 2003

(86) PCT No.: PCT/KR03/00326

§ 371 (c)(1),
(2), (4) Date: Aug. 23, 2004

(87) PCT Pub. No.: WO03/071718

PCT Pub. Date: Aug. 28, 2003

(65) Prior Publication Data

US 2005/0153659 A1 Jul. 14, 2005

(30) Foreign Application Priority Data

Feb. 21, 2002 (KR) .................. 10-2002-0009288
Feb. 14, 2003 (KR) .................. 10-2003-0009495

(51) Int. Cl.
*H04B 17/00* (2006.01)

(52) U.S. Cl. .................. 455/67.13; 455/522.1; 455/69; 370/335; 370/342

(58) Field of Classification Search ............ 455/67.13, 455/522.1, 69, 101; 370/335, 342; 435/7.1
See application file for complete search history.

(56) References Cited

U.S. PATENT DOCUMENTS

2001/0000750 A1 * 5/2001 Esteves et al. ............ 435/7.1

(Continued)

FOREIGN PATENT DOCUMENTS

KR 10-2001-0070515 7/2001

(Continued)

*Primary Examiner*—Sonny Trinh
*Assistant Examiner*—Phuoc Doan
(74) *Attorney, Agent, or Firm*—Lee & Morse, P.C.

(57) ABSTRACT

Provided are a mobile communication apparatus including an antenna array and a mobile communication method. The mobile communication apparatus has a base station and a mobile station. The mobile station measures the downlink characteristics, detects physical space information and approximate long-term information, produces short-term informatio, transforms the short-term information and the physical space information into a feedback signal, and transmits the feedback signal to the base station. The base station receives the feedback signal, extracts weighted information, beamforms dedicated physical channel signals, combines pilot channel signals with the result of the beamforming, and transmits the results of the combinations to the mobile station via the antenna array. The physical space information denotes space information about the location of the mobile station with respect to the base station, and the approximate long-term information denotes long-term information. Accordingly, degradation of the performance of communications caused by a great amount of information to be fed back station can be prevented while keeping a beamforming gain.

23 Claims, 13 Drawing Sheets

U.S. PATENT DOCUMENTS

| | | | |
|---|---|---|---|
| 2003/0058821 A1* | 3/2003 | Lee et al. | 370/335 |
| 2003/0109226 A1* | 6/2003 | Brunner et al. | 455/69 |
| 2005/0014474 A1* | 1/2005 | Jitsukawa et al. | 455/101 |
| 2005/0054366 A1* | 3/2005 | Chen et al. | 455/522 |

FOREIGN PATENT DOCUMENTS

| | | |
|---|---|---|
| KR | 10-2001-0087715 | 9/2001 |
| KR | 10-2001-0110401 | 12/2001 |
| KR | 10-2002-0081516 | 10/2002 |
| KR | 10-2002-0089094 | 11/2002 |
| WO | WO 96/036136 A | 11/1996 |

* cited by examiner

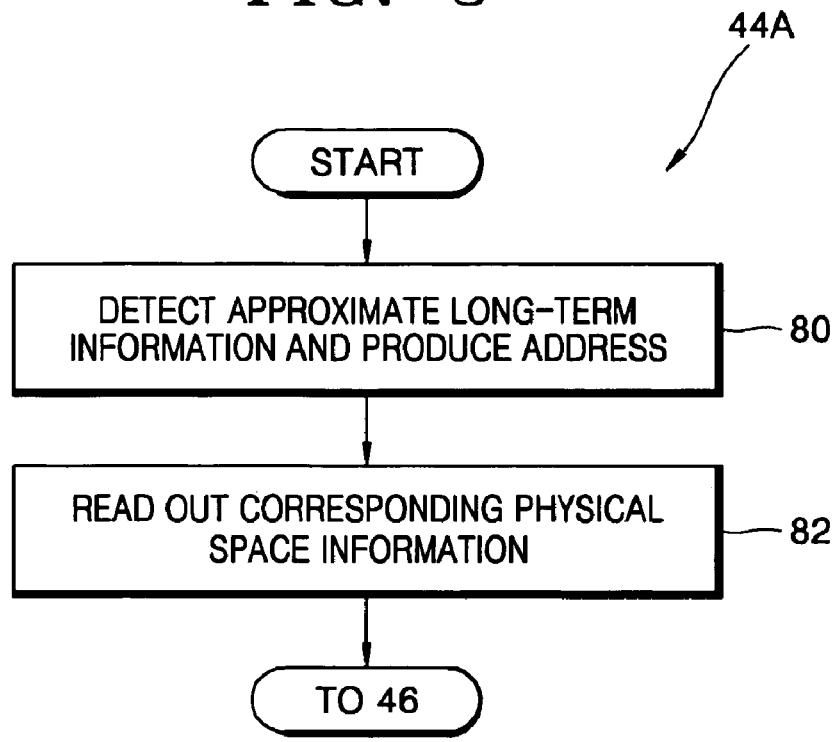
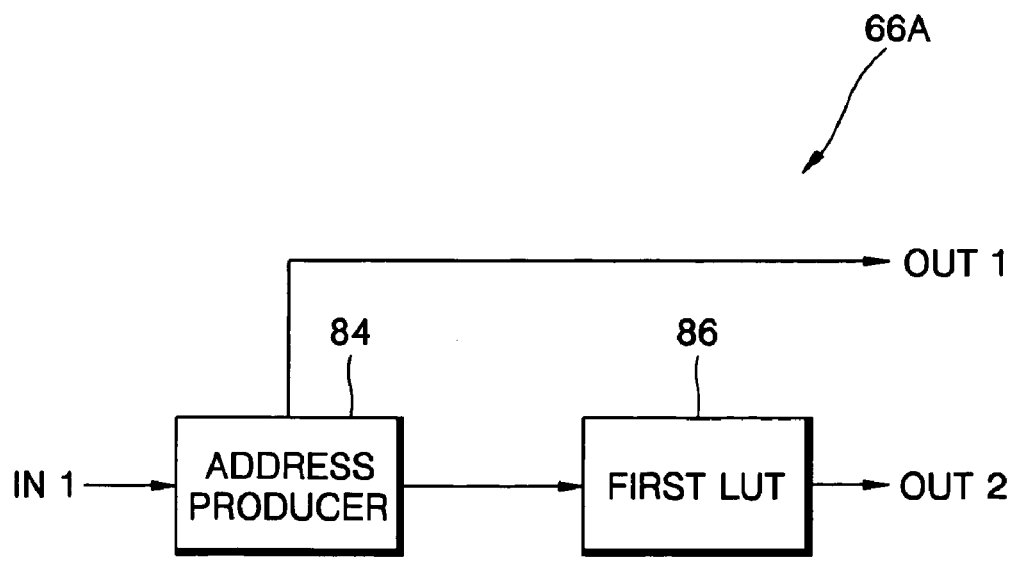

FIG. 7

| DOA | Angle Spread | Mapping | PREDETERMINED EFFECTIVE EIGENVECTORS | Index |
|---|---|---|---|---|
| 70° | 0° | ←----→ | $v_1$ | 1 |
| | 5° | ←----→ | $v_2$ | 2 |
| | 10° | ←----→ | $v_3$ | 3 |
| | 20° | ←----→ | $v_4$ | 4 |
| 60° | 0° | ←----→ | $v_5$ | 5 |
| | 5° | ←----→ | $v_6$ | 6 |
| | 10° | ←----→ | $v_7$ | 7 |
| | 20° | ←----→ | $v_8$ | 8 |
| ⋮ | | | | |
| 10° | 0° | ←----→ | $v_{29}$ | 29 |
| | 5° | ←----→ | $v_{30}$ | 30 |
| | 10° | ←----→ | $v_{31}$ | 31 |
| | 20° | ←----→ | $v_{32}$ | 32 |
| 0° | 0° | ←----→ | $v_{33}$ | 33 |
| | 5° | ←----→ | $v_{34}$ | 34 |
| | 10° | ←----→ | $v_{35}$ | 35 |
| | 20° | ←----→ | $v_{36}$ | 36 |
| -10° | 0° | ←----→ | $v_{37}$ | 37 |
| | 5° | ←----→ | $v_{38}$ | 38 |
| | 10° | ←----→ | $v_{39}$ | 39 |
| | 20° | ←----→ | $v_{40}$ | 40 |
| ⋮ | | | | |
| -60° | 0° | ←----→ | $v_{53}$ | 53 |
| | 5° | ←----→ | $v_{54}$ | 54 |
| | 10° | ←----→ | $v_{55}$ | 55 |
| | 20° | ←----→ | $v_{56}$ | 56 |
| -70° | 0° | ←----→ | $v_{57}$ | 57 |
| | 5° | ←----→ | $v_{58}$ | 58 |
| | 10° | ←----→ | $v_{59}$ | 59 |
| | 20° | ←----→ | $v_{60}$ | 60 |

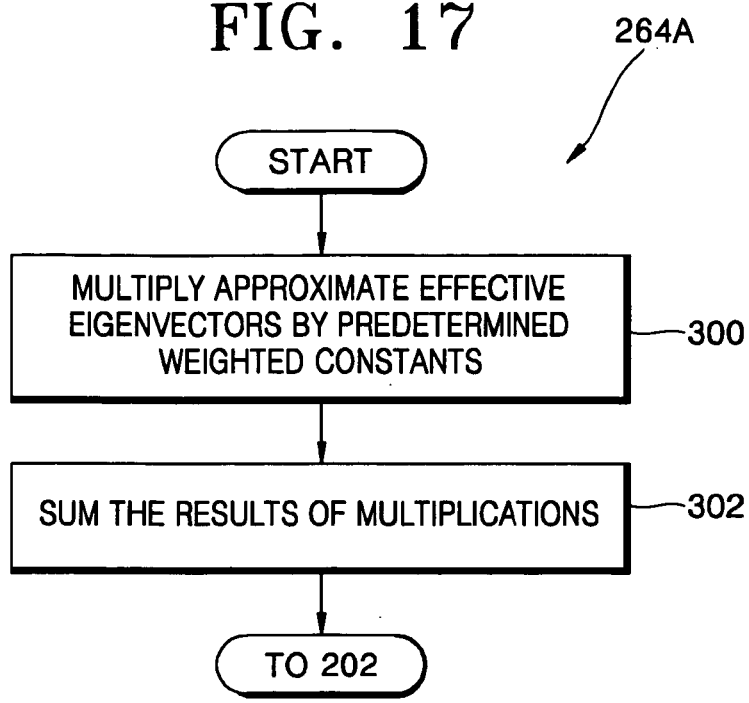
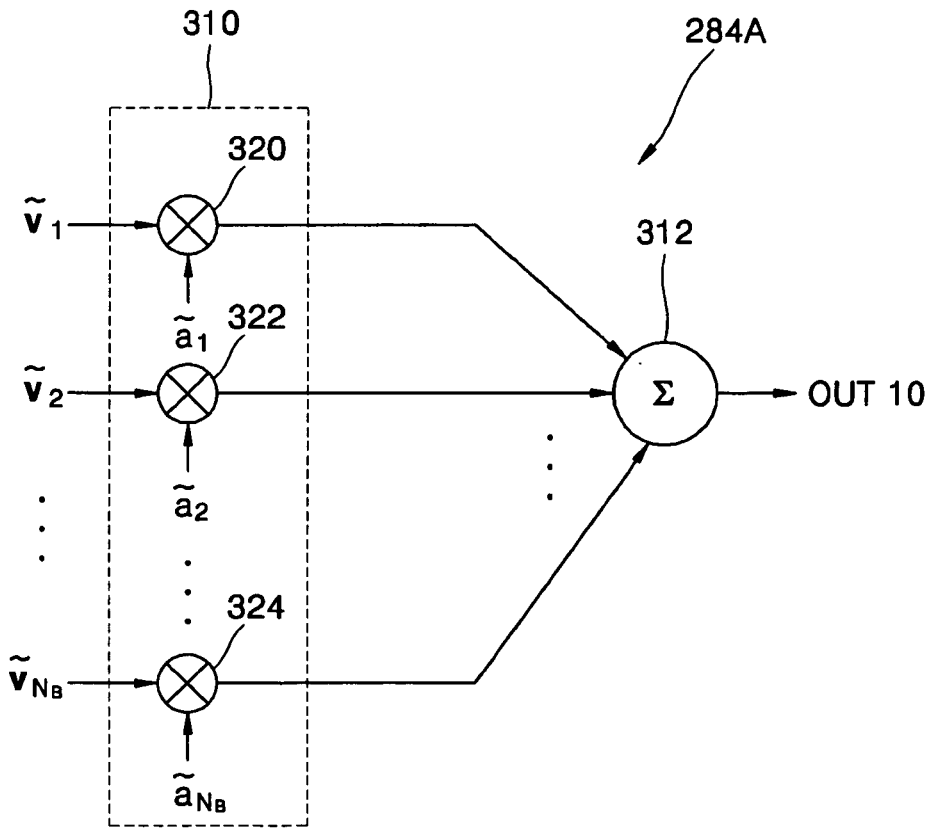

MOBILE COMMUNICATION APPARATUS INCLUDING ANTENNA ARRAY AND MOBILE COMMUNICATION METHOD

BACKGROUND OF THE INVENTION

This application claims the benefit of Korean Patent Application Nos. 2002-9288 and 2003-9495 filed on Feb. 21, 2002 and on Feb. 14, 2003 respectively, in the Korean Intellectual Property Office, the disclosures of which are incorporated herein in their entirety by reference.

1. Field of the Invention

The present invention relates to a mobile communication apparatus including an antenna array, by which interference of a received signal between users can be removed by massing the beams of a signal to be transmitted to individual users in order to minimize the influence of fading, interference, and noise in a mobile communication environment, and a mobile communication method performed in the mobile communication apparatus, and more particularly, to a mobile communication apparatus capable of improving the performance of a mobile communication system by reducing the amount of feedback information in order to make the mobile communication system insensitive to feedback errors or feedback delays, in contrast with an eigen beamforming method proposed by Siemens, in which eigenvectors are directly,quantized, and the quantized eigenvectors are fed by a mobile station to a base station, and a mobile communication method performed in the mobile communication apparatus.

2. Description of the Related Art

A next-generation mobile communication system is required to transmit information faster than existing mobile communication systems such as personal communication services (PCSs). Europe and Japan have already adopted a wideband code division multiple access (W-CDMA) system as a wireless access standard, while the North America has already adopted a CDMA-2000 (multi-carrier code division multiple access) system.

In a general mobile communication system, several mobile stations communicate with one another through a base station. In order to transmit data at a high speed, a mobile communication system should minimize loss due to the characteristics of a mobile communication channel, such as fading, and user interference. In particular, diversity systems are used to prevent communication from becoming unstable due to fading. A space diversity system, which is a type of diversity system, uses multiple antennas, that is, an antenna array.

In order to achieve fast data transmission, a general mobile communication system should overcome fading having the most serious effect on the performance of the mobile communication system, because fading reduces the amplitude of a received signal to several dB or several tens of dB. Here, the fading is one of the channel characteristics of the mobile communication system. As described above, fading can be overcome by several diversity techniques. A representative example of the diversity techniques is a rake receiver for performing the diversity using the delay or spread of a channel in a CDMA technique. A rake receiver performs a diversity reception technique for receiving a multi-path signal. However, the diversity technique does not operate diversity when a delay spread is low.

Another example of the diversity techniques is a time diversity system using interleaving and coding, which is used in a Doppler spread channel. However, the time diversity system is not suitable for a low-speed Doppler channel.

In a room channel with a low delay spread and a pedestrian channel corresponding to a low Doppler channel, a space diversity system is used in order to overcome fading. A space diversity system uses at least two antennas. If a signal received via one antenna is attenuated by fading, the space diversity system receives the signal via another antenna. The space diversity is classified into a reception antenna diversity using a reception antenna and a transmission antenna diversity using a transmission antenna. As it is difficult for a mobile station to install the reception antenna diversity in respect of area and costs, it is recommended that a base station use the transmission antenna diversity.

In the transmission antenna diversity, there are a closed loop transmission antenna diversity getting feedback of a downlink channel information from a mobile station to the base station, and an open loop transmission antenna diversity getting no feedback from a mobile station to the base station. In the transmission antenna diversity, a mobile station searches for an optimal weighted value by measuring the phase and magnitude of a downward channel formed from a base station to a mobile station and transmits the searched information to the base station. In order to measure the magnitude and phase of the moving channel, a base station must send different orthogonal pilot signals for different transmission antennas. A mobile station receives the pilot signals, measures the magnitude and phase of a channel using the received pilot signals, and searches for an optimal weighted value for a transmission antenna diversity from the measured channel magnitude and phase information.

For the transmission antenna diversity, if the number of transmission antennas of the base station increases, the diversity effect and the signal-to-noise ratio still improve, but the amount/speed of improvement in the diversity effect continuously decreases. Accordingly, to obtain a slightly-improved diversity effect while sacrificing a lot cost is not preferable. Hence, it is preferable that the number of antennas used in a base station increases to minimize the power of an interference signal and maximize the signal-to-noise ratio of an internal signal, instead of improving the diversity effect.

A transmission adaptive antenna array system invented in consideration of a beamforming effect that minimizes the influence that interference and noise as well as diversity effect have upon an internal signal is referred to as a downlink beamforming system. A system using feedback information like a transmission diversity is referred to as a closed loop downlink beamforming system. The closed loop downlink beamforming system, which uses information fed back from a mobile station to a base station, may degrade the performance of communications by failing to properly reflect changes in channel information if a feedback channel does not have a sufficient bandwidth.

The first and second TxAA modes standardized in a W-CDMA system, which is a European IMT-2000have the following problems when the number of antennas and the characteristics of a space-time channel vary. If the number of antennas increases, a weighted value for each antenna must be fed back, and hence a lot of information to be fed back is created. Thus, depending on the movement speed of a mobile station, the first and second TxAA modes degrade the communication performance. That is, generally, if the movement speed of a mobile station increases in a fading channel, a change in the space-time channel becomes serious. Thus, the feedback speed of channel information must increase. However, if the feedback speed is limited, feedback information increasing with an increase in the number of antennas consequently degrades the performance of communications. If the distance between antennas is not sufficient, the correlation between channels in each antenna increases. If the correlation between channels increases, the information amount of a channel matrix decreases. The effective use of a feedback method prevents performance degradation in a high-speed moving body environment even if the number of antennas increases. However, since the first and second TxAA modes are constructed under the assumption that the channels of two antennas that constitute the space-time channels are completely independent from each other, they cannot be used effectively when the number of antennas and the characteristics of the space-time channel change. In addition, the first and second TxAA modes have never been applied to an environment using more than 2 antennas and cannot provide excellent performance even when using 3 or more antennas.

Because of the above reasons, a beamforming antenna system is formed in case three or more antennas are used. A beamforming technique uses the difference in a direction between individual users and is suitable for an environment having a great correlation between channels of individual transceiving antennas. In particular, Siemens suggests that the 3GPP adopts an eigen beamforming technique which combines a diversity with a beam-forming. However, the eigen beamforming technique provides a lot of feedback information because it simply quantizes eigenvectors for beamforming and feeds the quantized eigenvectors back to a sender. Such a feedback of information in a large amount causes feedback information during transmission to be sensitive to generated errors and delays, thereby degrading the performance of mobile communication systems.

SUMMARY OF THE INVENTION

The present invention provides a mobile communication apparatus including an antenna array, by which the amount of information that is necessary for a beamforming and is fed from a mobile station back to a base station is reduced, thus increasing the performance of communication.

The present invention also provides a mobile communication method performed in the mobile communication apparatus including an antenna array, by which the amount of information that is necessary for a beamforming and is fed from a mobile station back to a base station is reduced, thus increasing the performance of communications.

According to an aspect of the present invention, there is provided a mobile communication apparatus having a mobile station and a base station including an antenna array. The mobile station measures the downlink characteristics of a channel of individual antennas from a signal received from the base station, detects physical space information and approximate long-term information from the measured downlink characteristics, produces short-term information from the approximate long-term information and the downlink characteristics, transforms the short-term information and the physical space information into a feedback signal, and transmits the feedback signal to the base station. The base station receives the feedback signal, extracts weighted information from the short-term information and the physical space information, which are restored from the received feedback signal, beamforms a dedicated physical channel signal using the weighted information, combines pilot channel signals with the results of the beamforming, and transmits the results of the combinations to the mobile station via the antenna array. The physical space information denotes space information about the location of the mobile station with respect to the base station, and the approximate long-term information denotes long-term information that is the most similar to long-term information in which the correlation characteristics of a channel of individual antennas are reflected.

According to another aspect of the present invention, there is provided a mobile communication method performed in a mobile communication apparatus having a mobile station and a base station including an antenna array. The mobile communication method includes step of measuring the downlink characteristics of a channel of individual antennas from a signal received from the base station, detecting physical space information and approximate long-term information from the measured downlink characteristics, producing short-term information using approximate long-term information and the downlink characteristics, transforming the short-term information and the physical space information into a feedback signal, and transmitting the feedback signal to the base station, and step of receiving the feedback signal, extracting weighted information from the short-term information and physical space information, which are restored from the received feedback signal, beamforming a dedicated physical channel signal using the weighted information, combining the beamforming results with pilot channel signals, and transmitting the results of the combinations to the mobile station via the antenna array. The physical space information denotes space information about the location of the mobile station with respect to the base station, and the approximate long-term information denotes long-term information that is the most similar to long-term information in which the correlation characteristics of a channel of individual antennas are reflected.

In a conventional mobile communication apparatus and a conventional mobile communication method, eigenvectors, which represent long-term information among information representing the downlink characteristics of a channel generated by multiple transmission antennas, are directly quantized, and the quantization result is fed by a mobile station to a base station. Hence, the amount of information to be fed by the mobile station to the base station increases, and the time taken to feed information back to the base station increases. Thus, if the speed at which a channel changes is higher than the speed at which long-term information is updated, the performance of mobile communications is degraded, and a load upon a backward channel formed from a mobile station to a base station increases. Consequently, the amount of data to be transmitted via the backward channel is reduced. However, in the mobile communication apparatus including an antenna array according to the present invention and the mobile communication method according to the present invention, because physical space information instead of long-term information is fed by a mobile station 20, 22, . . . , or 24 to a base station 10, the amount of information to be fed back to the base station 10 is reduced by 50% or greater. Accordingly, the updating speed of long-term information can be increased, and a fast mobile can adapt a fast channel change, that is, can quickly and smoothly respond to a change in a channel according to the speed. Also, the capacity of a backward channel that can be used to transmit data is increased because the amount of information to be fed back is reduced, and a received signal to noise ratio required by a mobile station can be significantly reduced as in the conventional mobile communication apparatus including an antenna array and the conventional mobile communication method. Therefore, the mobile communication apparatus and method according to the present invention have the effect that degradation of the performance of communications caused by a great amount of information to be fed back can be prevented while keeping a beamforming gain.

BRIEF DESCRIPTION OF THE DRAWINGS

The above and other features and advantages of the present invention will become more apparent by describing in detail exemplary embodiments thereof with reference to the attached drawings in which:

FIG. 5 is a flowchart for illustrating a preferred embodiment of the present invention of step 44 of FIG. 3;

FIG. 6 is a block diagram of an embodiment of the present invention of the long-term space information producer of FIG. 4;

FIG. 7 is a table of an embodiment of the present invention of the first lookup table of FIG. 6;

FIG. 17 is a flowchart for illustrating an embodiment of the present invention of step 264 of FIG. 15; and FIG. 18 is a block diagram of an embodiment of the present invention of the information combiner of FIG. 16.

DETAILED DESCRIPTION OF THE INVENTION

The structure and operations of embodiments of a mobile communication apparatus including an antenna array according to the present invention and a mobile communication method performed in the mobile communication apparatus will be described hereinafter with reference to the accompanying drawings.

Figure 1:
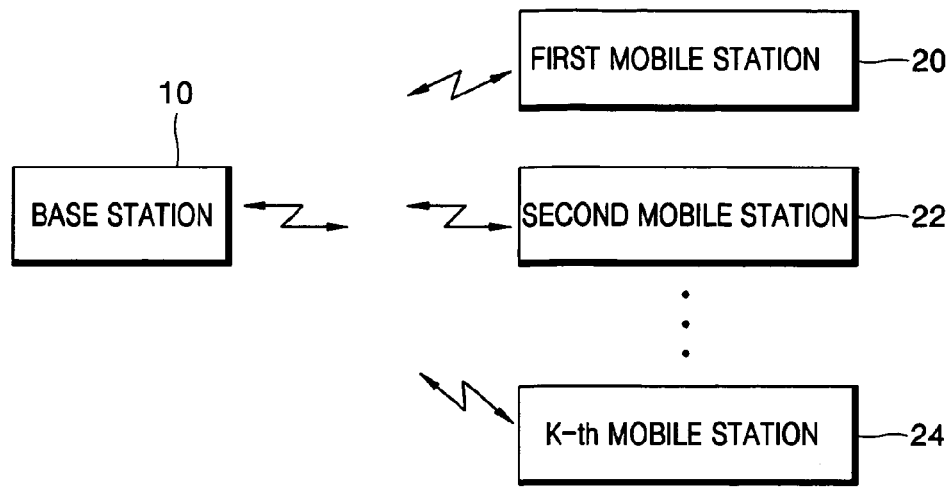
FIG. 1 is a schematic block diagram of a mobile communication apparatus including an antenna array, according to the present invention.

FIG. 1 is a schematic block diagram of a mobile communication apparatus including an antenna array, according to the present invention. The mobile communication apparatus is composed of a base station 10 and first, second, . . . , and K-th mobile stations 20, 22, . . . , and 24. Here, K denotes a positive integer.

Figure 2:
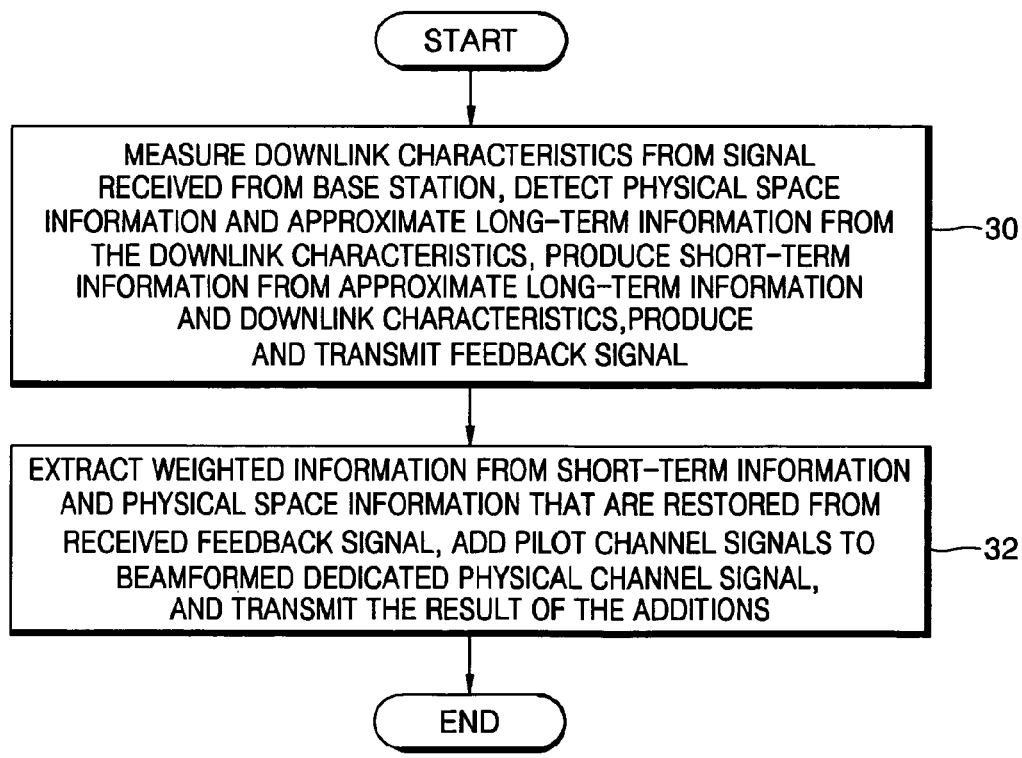
FIG. 2 is a flowchart for illustrating a mobile communication method according to the present invention, performed in the mobile communication apparatus of FIG. 1.

FIG. 2 is a flowchart for illustrating a mobile communication method according to the present invention, performed in the mobile communication apparatus of FIG. 1. This mobile communication method includes step 30 of obtaining a feedback signal and step 32 of extracting weighted information from the feedback signal.

In step 30, a k-th ($1 \leq k \leq K$) mobile station among the first, second, . . . , and K-th mobile stations 20, 22, . . . , and 24 of FIG. 1 measures the downlink characteristics $H_{DL}$ of a channel for each of the antennas of the antenna array included in the base station 10 from a signal received from the base station 10, and detects physical space information and approximate long-term information from the measured downlink characteristics $H_{DL}$. Hereinafter, bold characters denote vectors, and non-bold characters denote scalars. Still in step 30, the k-th mobile station also produces short-term information from the approximate long-term information and the downlink characteristics $H_{DL}$, transforms the physical space information and the short-term information into a feedback signal, and transfers the feedback signal to the base station 10. Here, $H_{DL}$ denotes a matrix. The column components of the matrix $H_{DL}$ are obtained with respect to the space, and the row components are obtained with respect to the time. The physical space information denotes space information about the location of the k-th mobile station 20, 22, . . . , or 24 with respect to the base station 10. For example, the physical space information may be a direction of arrival (DOA) and an angle spread. The approximate long-term information denotes long-term information the most approximate to long-term information, which reflect the correlations between channels for individual antennas.

Embodiments of step 30 and an embodiment of the k-th mobile station 20, 22, . . . , or 24 will now be described with reference to attached drawings.

Figure 3:
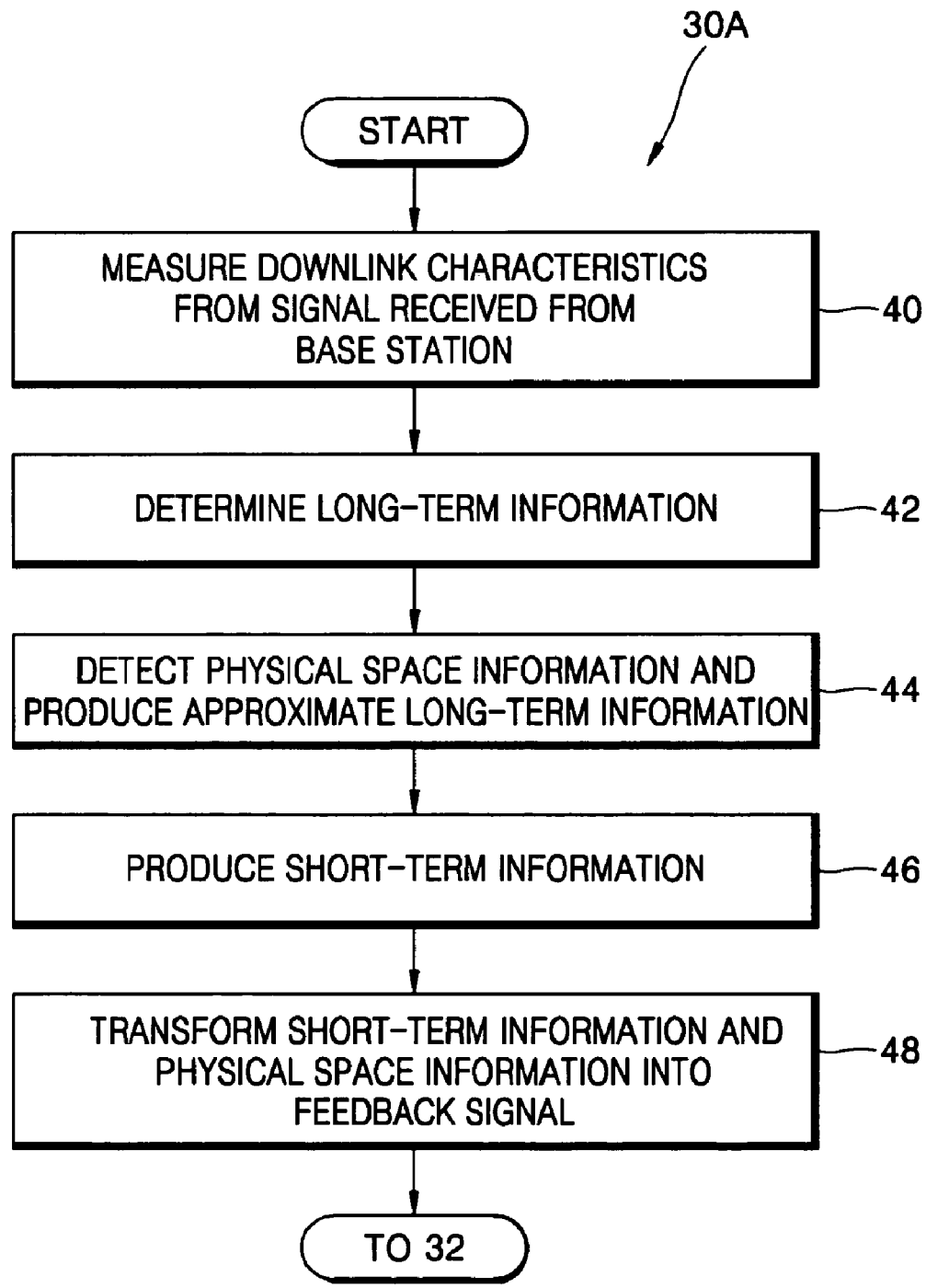
FIG. 3 is a flowchart for illustrating a preferred embodiment of the present invention of step 30 of FIG. 2.

FIG. 3 is a flowchart for illustrating step 30A, which is a preferred embodiment of the present invention of step 30 of FIG. 2. In step 40, the downlink characteristics $H_{DL}$ of a channel are measured. In steps 42, 44, and 46, the physical space information, the approximate long-term information, and the short-term information of a channel are determined from the measured downlink characteristics $H_{DL}$. In step 48, the determined physical space information and the short-term information are transformed into a feedback signal.

Figure 4:
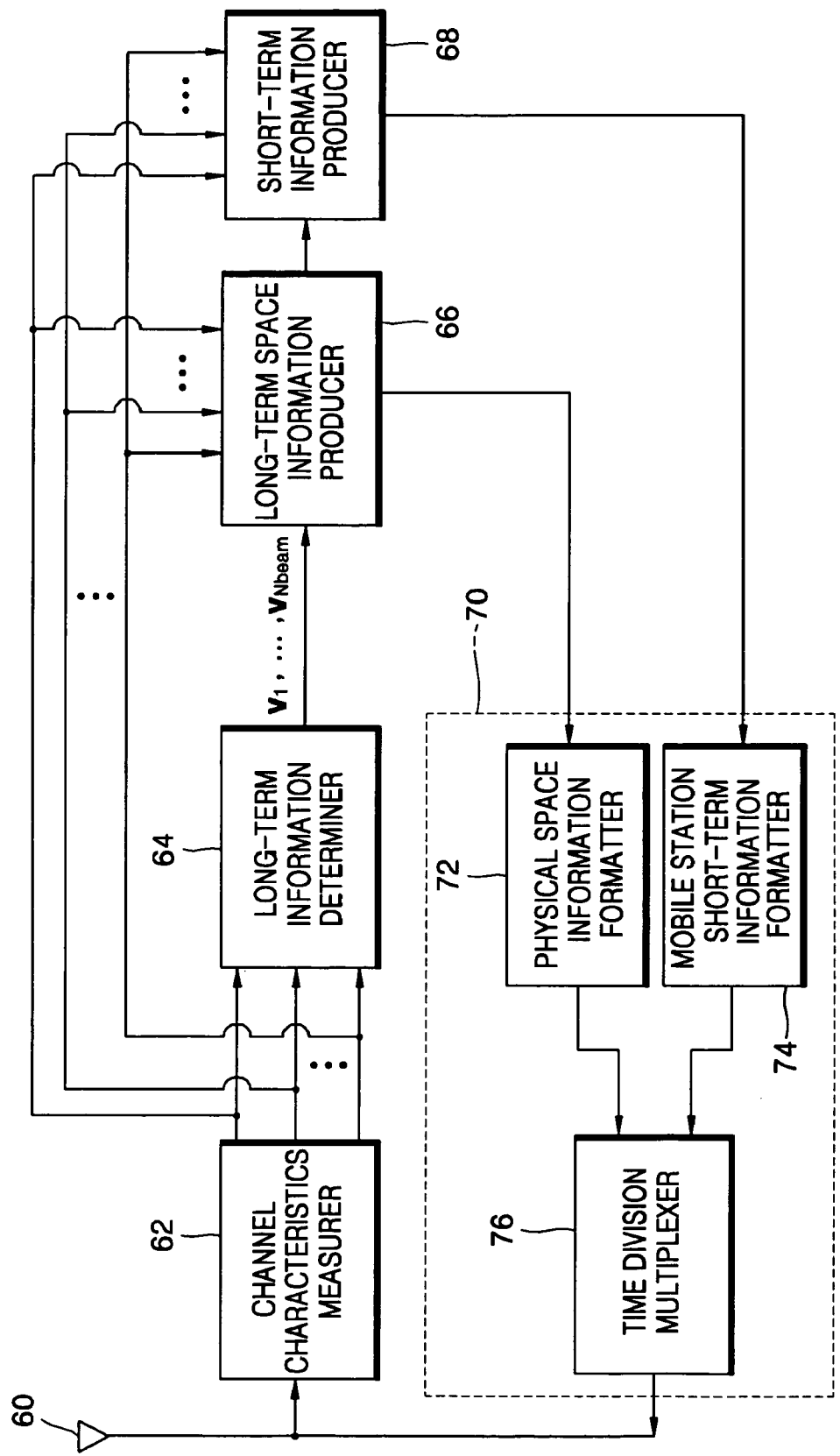
FIG. 4 is a block diagram of a preferred embodiment of the present invention of the k-th mobile station of FIG. 1.

FIG. 4 is a block diagram of the k-th mobile station 20, 22, . . . , or 24 of FIG. 1 according to a preferred embodiment of the present invention. As shown in FIG. 4, the k-th mobile station 20, 22, . . . , or 24 includes an antenna 60, a channel characteristics measurer 62, a long-term information determiner 64, a long-term space information producer 66, a short-term information producer 68, and mobile station signal transformer 70.

In step 40, the channel characteristics measurer 62 of FIG. 4 receives a signal from the base station 10 via the antenna 60, measures the downlink characteristics $H_{DL}$ of a channel of individual antennas from the received signal, and outputs the measured downlink characteristics $H_{DL}$ to the short-term information producer 68 and either of the long-term information determiner 64 or the long-term space information producer 66. Here, the downlink characteristics $H_{DL}$ of a channel denotes the phase and magnitude of a channel transferred from the base station 10 to the k-th mobile station 20, 22, . . . , or 24.

According to an embodiment of the present invention, as shown in FIGS. 3 and 4, in step 42, the long-term information determiner 64 produces eigenvectors $v_1, \ldots,$ and $v_{ant}$, which denote eigen beams, from the channel downlink characteristics $H_{DL}$ temporally and spatially measured by the channel characteristics measurer 62, using an eigenvalue decomposition (EVD) method, selects effective (i.e., usable) eigenvectors $v_1$ through $V_{Nbeam}$ out of the produced eigenvectors $v_1$ through $v_{ant}$, determines the selected effective eigenvectors as long-term information, and outputs the long-term information to the long-term space information producer 66. Here, 'ant' denotes the number of antennas in an antenna array included in the base station 10, and 'Nbeam' denotes the number of effective eigenvectors. The EVD method is disclosed in a book written by 'G. Golub' and 'C. Van. Loan' with the title of "Matrix Computation" and published in 1996 by the Johns Hopkins University publishing company located in London. Next, in step 44, the long-term space information producer 66 detects physical space information and produces approximate long-term information from the long-term information, that is, the effective eigenvectors $v_1$ through $V_{Nbeam}$, received from the long-term information determiner 64 and outputs the detected physical space information to the mobile station signal transformer 70 and the produced approximate long-term information to the short-term information producer 68.

According to another embodiment of the present invention, step 30A of FIG. 3 may not include step 42, and the mobile station of FIG. 4 may not include the long-term information determiner 64. In this alternative, after step 40, the long-term space information producer 66 detects physical space information and approximate long-term information from the channel downlink characteristics $H_{DL}$ received from the channel characteristics measurer 62, in step 44.

In the case where step 30A of FIG. 3 includes step 42 and the mobile station of FIG. 4 includes the long-term information determiner 64, preferred embodiments of the present invention of step 44 and the long-term space information producer 66 will be described hereinafter.

FIG. 5 is a flowchart for illustrating step 44A, which is a preferred embodiment of the present invention of step 44 of FIG. 3. Step 44A includes steps 80 and 82 of detecting physical space information and producing approximate long-term information.

FIG. 6 is a block diagram of a long-term space information producer 66A, which is a preferred embodiment of the present invention of the long-term space information producer 66 of FIG. 4. The long-term space information producer 66A includes an address producer 84 and a first lookup table (LUT) 86.

Referring to FIG. 6, after step 42, the address producer 84 detects approximate long-term information that is the most approximate to the long-term information (i.e., the effective eigenvectors $v_1$ through $V_{Nbeam}$) received from the long-term information determiner 64 via an input terminal IN1 and outputs the detected approximate long-term information to the short-term information producer 68 via an output terminal OUT1 while addresses for the approximate long-term information are produced and output to the first LUT 86, in step 80. Thereafter, in step 82, the first LUT 86 outputs physical space information stored in the addresses received from the address producer 84 to the mobile station signal transformer 70 via an output terminal OUT2.

FIG. 7 shows a table of an embodiment of the present invention of the first LUT 86 of FIG. 6, which includes DOAs, angle spread (AS), predetermined effective eigenvectors, and indices (or addresses).

If the minimum unit of a DOAs (θ) and a possibility of occurrence of AS (φ) are restricted, the first LUT 86 of FIG. 7 produces a total of 60 effective eigenvectors as shown in Equation 1:

$$[\lambda_1 V_1 \lambda_2 V_2 \ldots \lambda_{N_B} V_{N_B}] = EVD_{\it{eff}}(R(\theta,\phi)) \quad (1)$$

wherein $EVD_{\it{eff}}$ denotes a function for searching for effective eigenvectors and eigenvalues from the results of EVD, $\lambda_i$ an eigenvalue, $v_j$ denotes an eigenvector, and R(,) denotes a channel correlation matrix that is produced using DOAs (θ) and AS(φ) using Equation 2:

$$R(\theta, \phi) = \frac{1}{Q+1} \sum_{q=-Q/2}^{Q/2} a\left(\theta + \phi\frac{q}{Q}\right) a^H\left(\theta + \phi\frac{q}{Q}\right) \quad (2)$$

wherein a direction vector a(θ) is [1 exp(jψ) exp(j2Ψ) ... exp(j(B−1)Ψ)], where Ψ=πsin (θ).

If physical space information is read out from the first LUT 86 of FIG. 7, the mobile station signal transformer 70 can express all eigenvectors included in the physical space information read from the first LUT 86 using a 6-bit feedback signal.

If the DOA (−80°<θ<80°) is quantized in units of 10° (i.e., a resolution of 10°), and the AS (φ) is expressed as 0°, 5°, 10°, and 20°, a total of 8 bits of information is required to feed one eigenvector back to a base station, and a total of 16 bits of information is enough to feed two eigenvectors back. If the first LUT 86 of FIG. 7 is used, the amount of information fed from the k-th mobile station 20, 22, ..., or 24 back to the base station 10 is only 30% of 54-bit long-term information proposed by Siemens.

Figure 8:
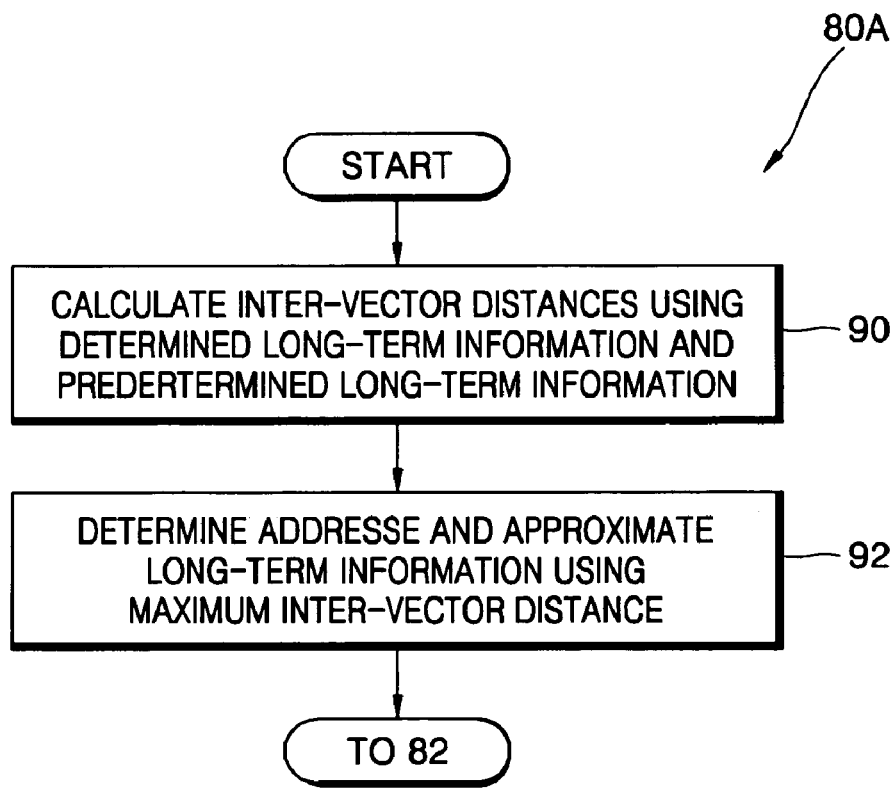
FIG. 8 is a flowchart for illustrating a preferred embodiment of the present invention of step 80 of FIG. 5.

FIG. 8 is a flowchart for illustrating step 80A, which is a preferred embodiment of the present invention of step 80 of FIG. 5. Step 80A is comprised of step 90 of calculating a distance between vectors and step 92 of obtaining an address and approximate long-term information.

Figure 9:
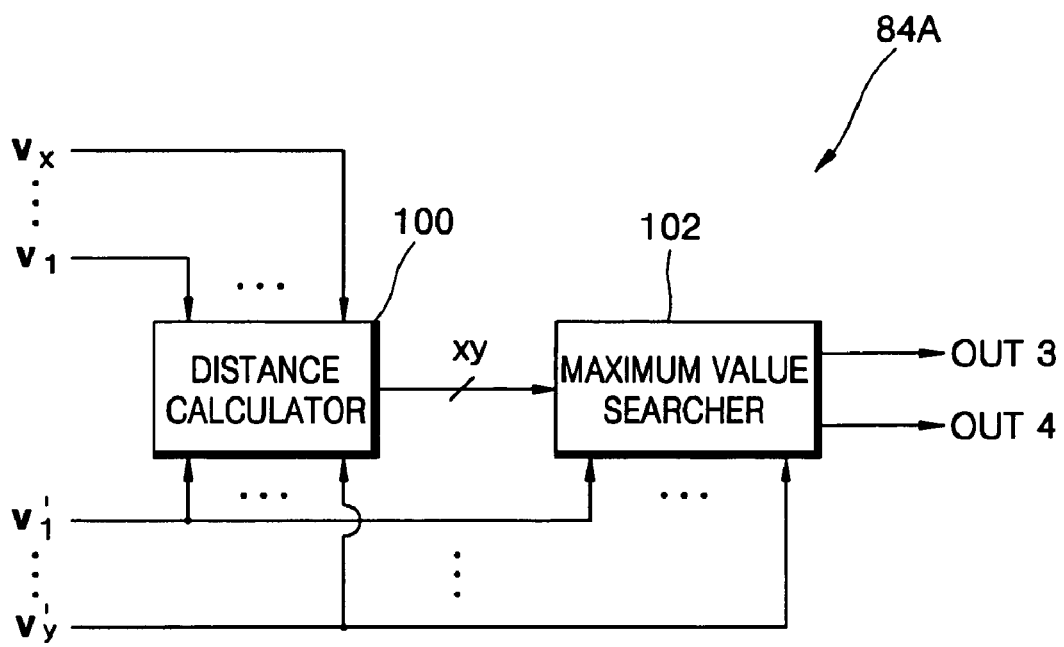
FIG. 9 is a block diagram of a preferred embodiment of the present invention of the address producer of FIG. 6.

FIG. 9 is a block diagram of an address producer 84A, which is a preferred embodiment of the present invention of the address producer 84 of FIG. 6. The address producer 84A includes a distance calculator 100 and a maximum value searcher 102.

After step 42, the distance calculator 100 applies norms to the differences between each of at least one of the effective eigenvectors $v_1, v_2, \ldots,$ and $v_x$ (where x corresponds to Nbeam and is a positive integer), which are long-term information determined by the long-term determiner 64 of FIG. 4, and predetermined effective eigenvectors $v'_1, v'_2, \ldots,$ and $v'_y$, square each of the norms, and determines t results of the squaring as inter-eigenvector distances, in step 90.

Thereafter, in step 92, the maximum value searcher 102 determines as an address the order of the greatest distance in the inter-vector distances received from the distance calculator 100, which are calculated with respect to each of the effective eigenvectors corresponding to the determined long-term information, and outputs addresses to the first LUT 86 via an output terminal OUT3. Still in step 92, the maximum value searcher 102 determines a predetermined effective eigenvector corresponding to the greatest inter-vector distance as approximate long-term information, which is approximate to the determined effective eigenvector, and outputs the approximate long-term information to the short-term information producer 68 via an output terminal OUT4.

To facilitate understanding of the present invention, the structure and operation of the address producer 84A of FIG. 9 will be described on the assumption that x is 2.

Figure 10:
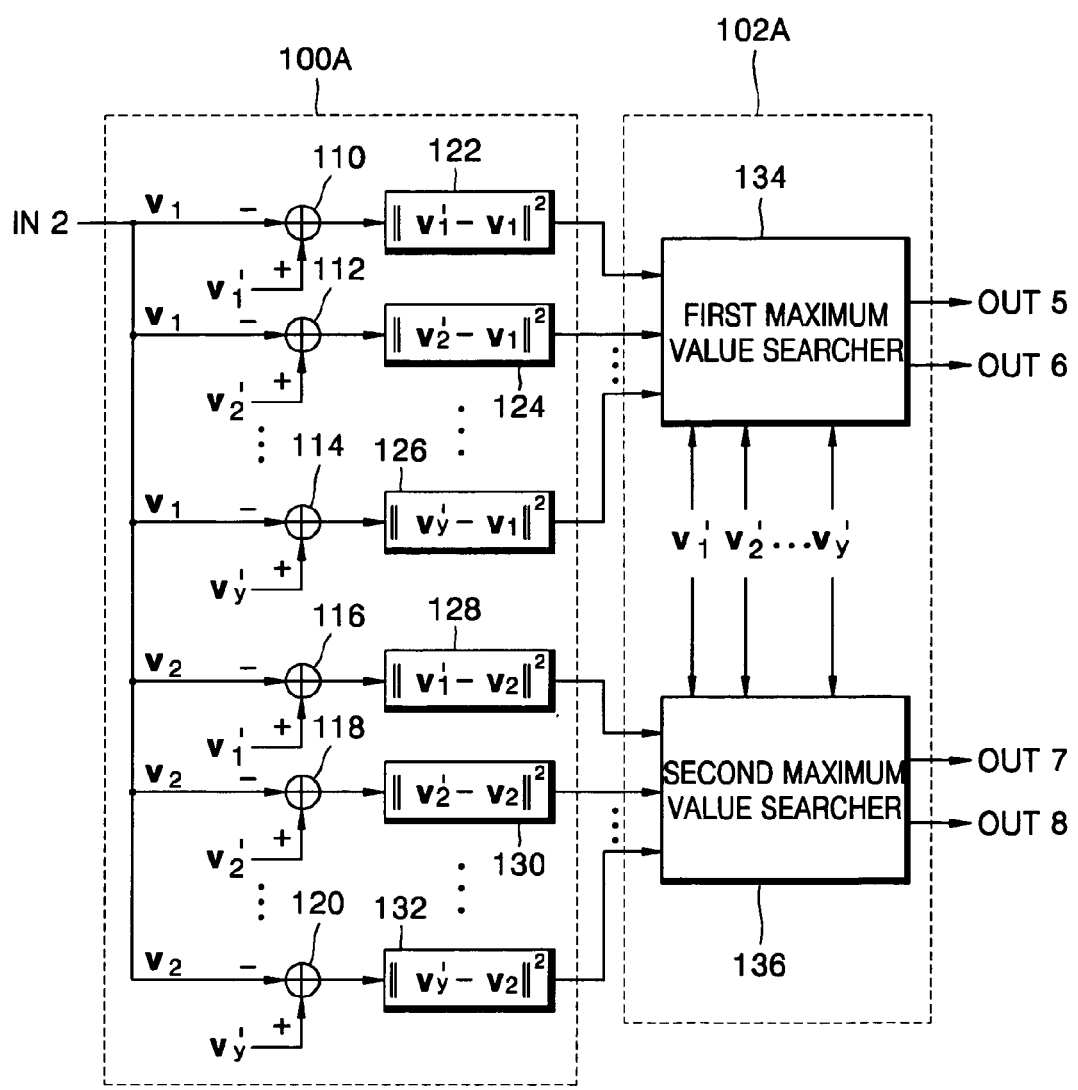
FIG. 10 is a block diagram of a preferred embodiment of the present invention of the address producer of FIG. 9.

FIG. 10 is a block diagram of a preferred embodiment of the present invention of the address producer 84A of FIG. 9, which includes an address calculator 1 OOA and a maximum value searcher 102A.

To perform step 90, the distance calculator 100A includes first through y-th subtractors 110, 112, ..., and 114, (y+1)th through 2y-th subtractors 116, 118, ..., and 120, and first through 2y-th operation units 122, 124, ..., and 132.

The first through y-th subtractors 110, 112, ..., and 114 of FIG. 10 subtract the effective eigenvector $v_1$ received from the long-term information determiner 64 from each of the predetermined effective eigenvectors $v'_1$, $v'_2$, ..., and $v'_y$, outputs the results of the subtractions to the first through y-th operation units 122, 124, ..., and 126. The first through y-th operation units 122, 124, ..., and 126 apply norms to the subtraction results received from the first through y-th subtractors 110, 112, ..., and 114, square the norms, and output the squared results as inter-vector distances to a first maximum value searcher 134. In FIG. 10, $\|0\|$ denotes a norm. Similarly, the (y+1)th through 2y-th subtractors 116, 118, ..., and 120 subtract the effective eigenvector $v_2$ received from the long-term information determiner 64 from each of the predetermined effective eigenvectors $v'_1$, $v'_2$, ..., and $v'_y$ and outputs the results of the subtractions to the (y+1)th through 2y-th operation units 128, 130, ..., and 132. The (y+1)th through 2y-th operation units 128, 130, ..., and 132 apply norms to the subtraction results received from the (y+1)th through 2y-th subtractors 116, 118, ..., and 120, square the norms, and output the squared results as inter-vector distances to a second maximum value searcher 136.

To perform step 92, the maximum value searcher 102A includes the first and second maximum value searchers 134 and 136. For the effective eigenvector $v_1$ determined as long-term information, the first maximum value searcher 134 searches for the greatest distance from the inter-vector distances that are received from the first through y-th operation units 122, 124, ..., and 126, determines the order of the greatest distance to be an address, and outputs the address via an output terminal OUT5. Also, the first maximum value searcher 134 determines as approximate long-term information with respect to the determined long-term information a predetermined effective eigenvector used in obtaining the greatest distance and outputs the determined approximate long-term information to the short-term information producer 68 via an output terminal OUT6. If the inter-vector distance output from the second operation unit 124, which is the second one from the first through y-th operation units 122, 124, ..., and 126, has the greatest value, a number 2 is determined as an address and output to the first LUT 86 via an output terminal OUT5. At this time, among the predetermined effective eigenvectors $v'_1$, $v'_2$, ..., and $v'_y$, the predetermined effective eigenvector $v'_2$ used in calcula inter-vector distance output from the second operation unit 124 is determined as approximate long-term information the most similar to the long-term information $v_1$ and output via an output terminal OUT6.

Similarly, for the effective eigenvector $v_2$ determined as long-term information, the second maximum value searcher 136 searches for the greatest distance from the inter-vector distances that are received from the (y+1)th through 2y-th operation units 128, 130, ..., and 132, determines the order of the greatest distance to be an address, and outputs the address via an output terminal OUT7. Also, the second maximum value searcher 136 determines as approximate long-term information with respect to the determined long-term information a predetermined effective eigenvector used in obtaining the greatest distance and outputs the approximate long-term information to the short-term information producer 68 via an output terminal OUT8. For example, if the inter-vector distance output from the 2y-th operation unit 132, which is the y-th one from the (y+1)th through 2y-th operation units 128, 130, ..., and 132, that is, the order of which is y, has the greatest value among the inter-vector distances output from the (y+1)th through the 2y-th operation units 128, 130, ..., and 132, the order y is determined as an address and output to the first LUT 86 via an output terminal OUT7. At this time, among the predetermined effective eigenvectors $v'_1$, $v'_2$, ..., and $v'_y$, the predetermined effective eigen $v'_y$ used in calculating the inter-vector distance output from the 2y-th operation unit 132 is determined as approximate long-term information with respect to the determined long-term information $v_2$ and output to the short-term information producer 68 via an output terminal OUT8.

After step 44, the short-term information producer 68 produces short-term information using the downlink characteristics $H_{DL}$ received from the channel characteristics measurer 62 and the approximate long-term information received from the long-term space information producer 66 and outputs the short-term information to the mobile station signal transformer 70, in step 46.

Preferred embodiments of the present invention of step 46 and the short-term information producer 68 will be described hereinafter with reference to attached drawings.

Figure 11:
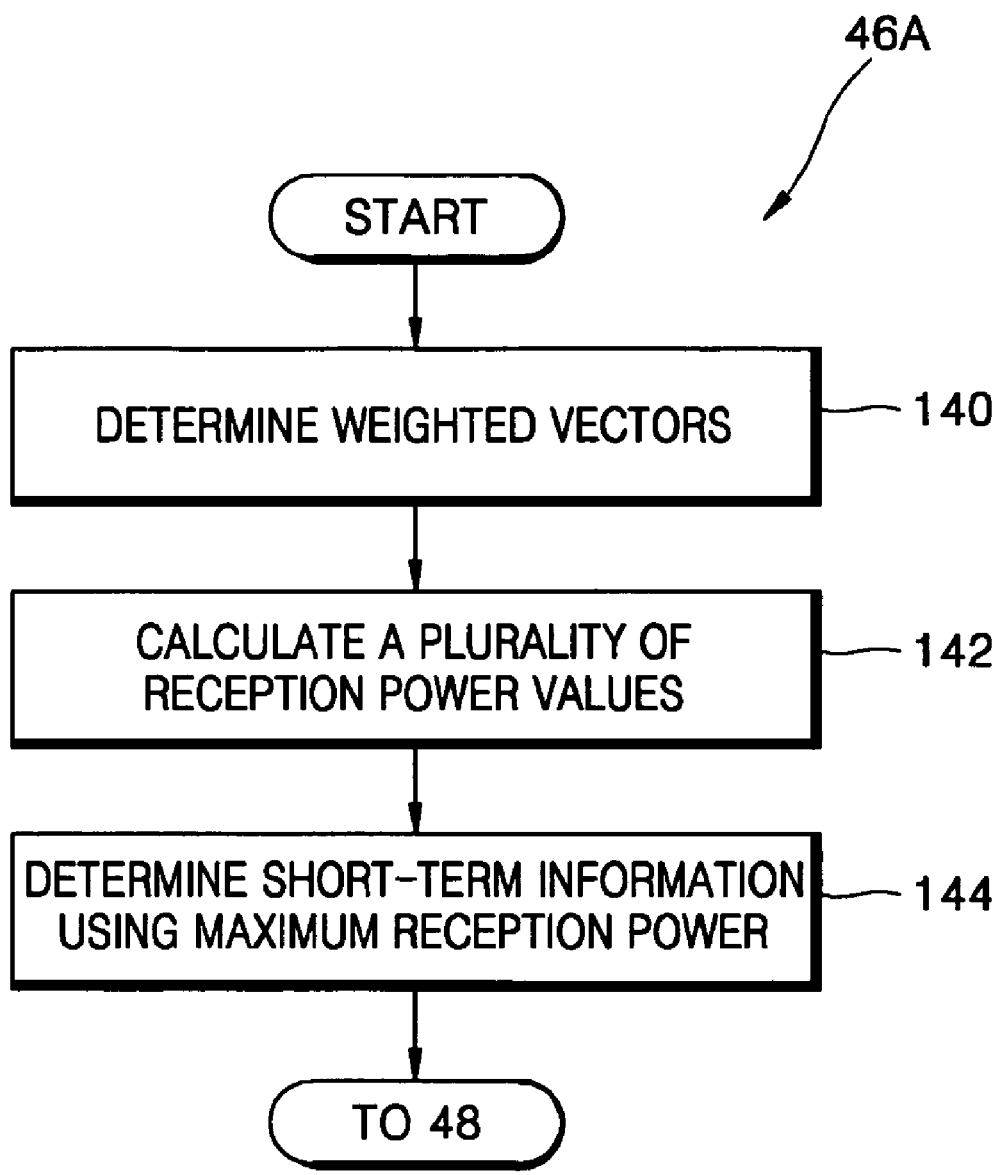
FIG. 11 is a flowchart for illustrating a preferred embodiment of the present invention of step 46 of FIG. 3.

FIG. 11 is a flowchart for illustrating step 46A, which is a preferred embodiment of the present invention of step 46 of FIG. 3. The step 46A includes steps 140 and 142 of obtaining reception power values using determined weighted vectors and step 144 of determining short-term information using the maximum power value among the reception power values.

Figure 12:
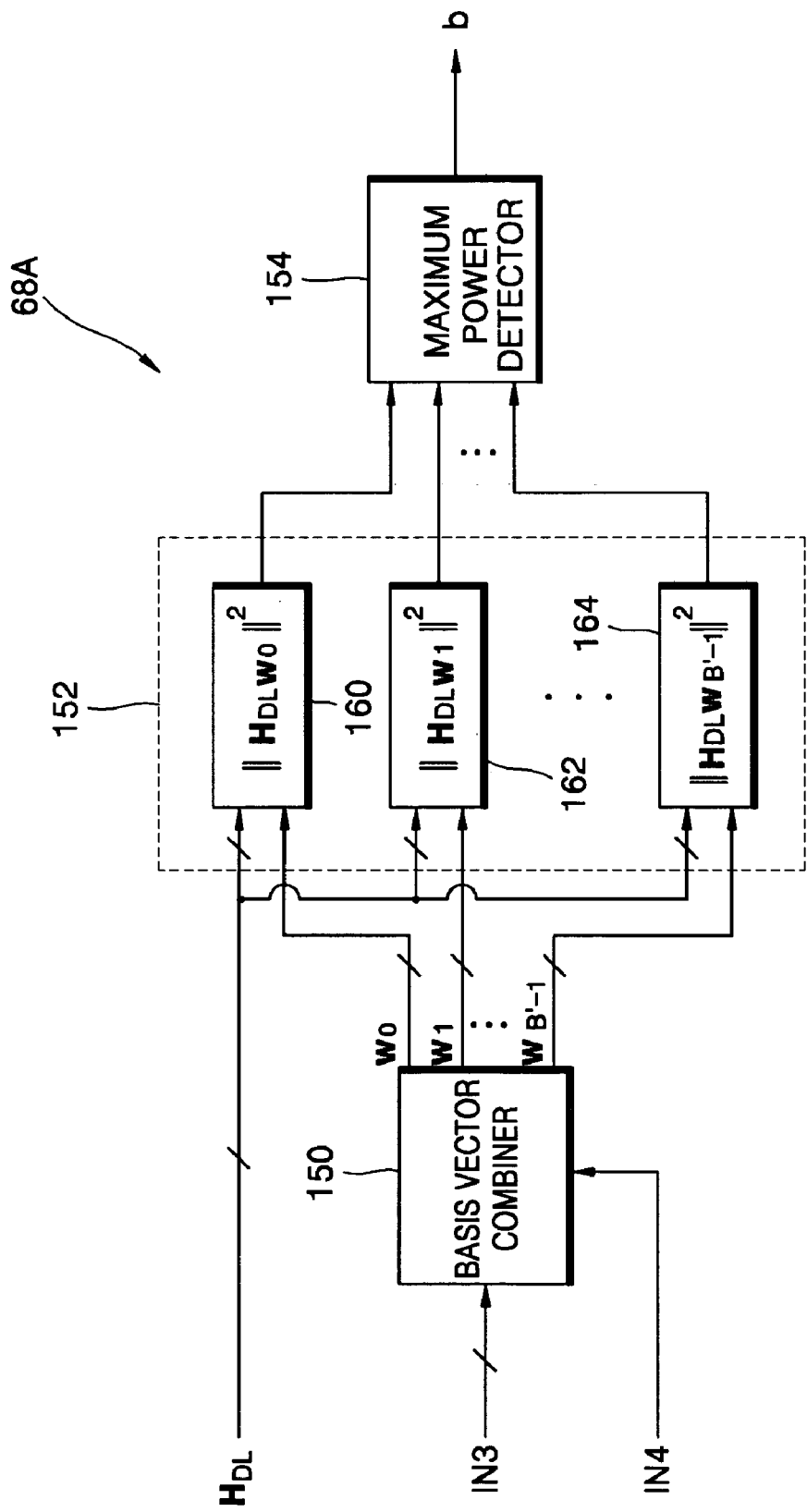
FIG. 12 is a block diagram of a preferred embodiment of the present invention of the short-term information producer of FIG. 4.

FIG. 12 is a block diagram of a short-term information producer 68A, which is a preferred embodiment of the present invention of the short-term information producer 68 of FIG. 4. The short-term information producer 68A includes a basisvector combiner 150, a reception power calculator 152, and a maximum power detector 154.

After step 44, the basisvector combiner 150 combines all predetermined weighted constants $a_1$, $a_2$, ..., and $a_{NB}$ (where NB denotes the number of effective eigenvectors and is the same as Nbeam) received via an input terminal IN3 with the approximate long-term information received from the long-term space information producer 66 via the input port IN4 and outputs the combination results as weighted vectors $w_0$, $w_1$, ..., and $w_{B'-1}$ (where B' denotes the number of pieces of predetermined short-term information) to the reception power calculator 152, in step 140.

Thereafter, in step 142, the reception power calculator 152 multiplies the weighted vectors $w_0$, $w_1$, ..., and $w_{B'-1}$ received from the basisvector combiner 150 by the downlink characteristics $H_{DL}$ received from the channel characteristics measurer 62, applies a square of norm to the results of the multiplications, and outputs a plurality of reception power value, which are the results of the squaring, to the maximum power detector 154.

The reception power calculator 152 is comprised of (2y+1)th through (2y+B')th operation units 160, 162, ..., and 164, which multiply the weighted vectors $w_0$, $w_1$, ..., and $w_{B'-1}$ by the downlink characteristics $H_{DL}$, apply norms to the multiplication results, square the norms, and outputs the squaring results as a plurality of reception power values to the maximum power detector 154.

After step 142, the maximum power detector 154 detects as maximum reception power the greatest value among the plurality of reception power values received from the reception power calculator 152, determines, as short-term information, indices where coefficients used to obtain the weighted vector used to calculate the maximum reception power are located, and outputs the determined short-term information b to the mobile station signal transformer 70, in step 144.

After step 46, the mobile station signal transformer 70 transforms the short-term information obtained by the short-term information producer 68 and the physical space information obtained by the long-term space information producer 66 into a feedback signal, in step 48. The feedback signal is transmitted to the base station 10 via an antenna 60. For that, the mobile station signal transformer 70 includes a physical space information formatter 72, a mobile station short-term information formatter 74, and a time division multiplexer 76. The physical space information formatter 72 formats the physical space information received from the long-term space information producer 66 such that the physical space information can be properly fed back to the base station 10, and outputs the formatted physical space information to the time division multiplexer 76. In the meantime, the mobile station short-term information formatter 74 formats the short-term information received from the short-term information producer 68 and outputs the formatted short-term information to the time division multiplexer 76. The time division multiplexer 76 performs time division multiplexing on the formatted physical space information received from the physical space information formatter 72 and the formatted short-term information received from the mobile station short-term information formatter 74 and outputs the time division multiplexed results in the form of a feedback signal to the antenna 60.

According to the present invention, the formatted physical space information received from the physical space information formatter 72 is less frequently multiplexed than the formatted short-term information received from the mobile station short-term information formatter 74.

After step 30, the base station 10 receives a feedback signal from the k-th mobile station 20, 22, . . . , or 24, extracts weighted information from physical space information and short-term information which are restored from the received feedback signal, beamforms a dedicated physical channel signal using weighted information, adds pilot channel signals $CPICH_1$, $CPICH_2$, $CPICH_3$, . . . , and $CPICH_{ant}$ to the beamformed dedicated physical channel signal, and outputs the results of the additions to the mobile station via an antenna array, in step 32.

Embodiments of the present invention of step 32 and the base station 10 will now be described with reference to attached drawings.

Figure 13:
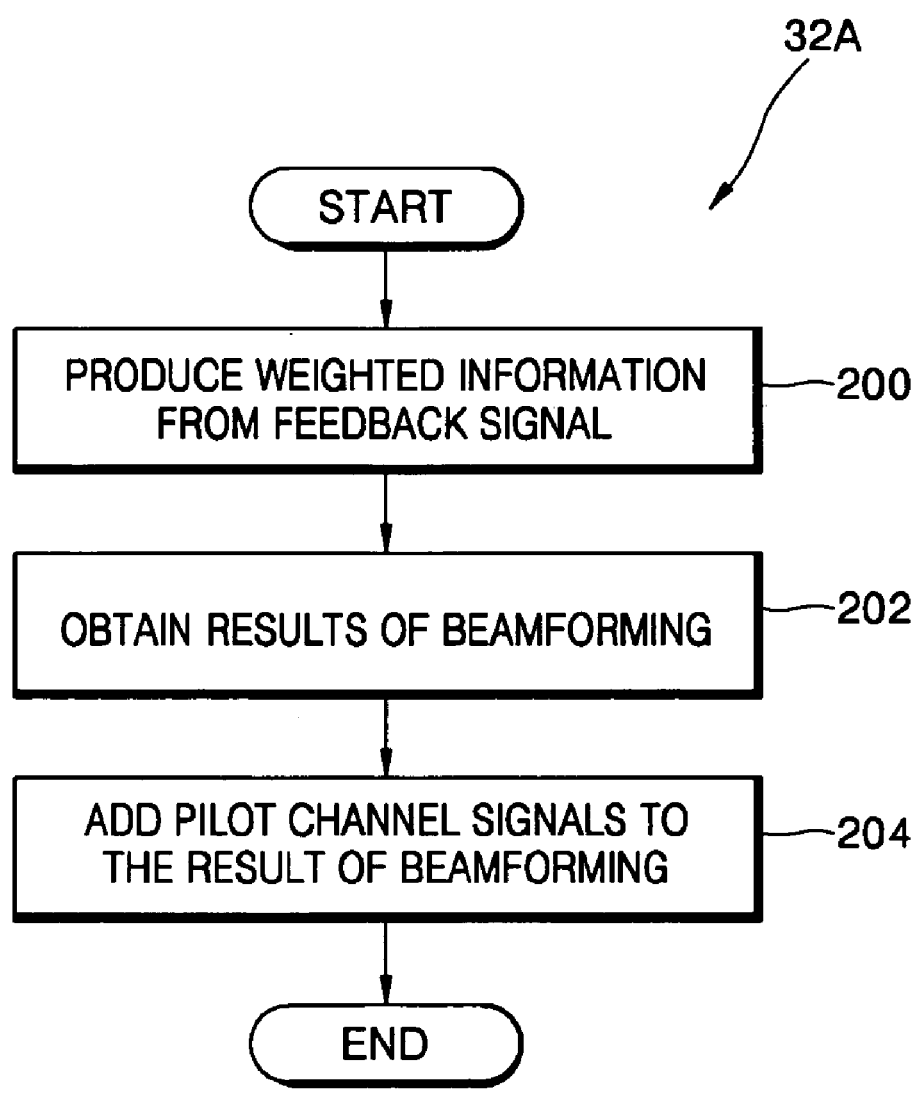
FIG. 13 is a flowchart for illustrating an embodiment of the present invention of step 32 of FIG. 2.

FIG. 13 is a flowchart for illustrating step 32A, which is a preferred embodiment of the present invention of step 32 of FIG. 2. Step 32A includes step 200 of producing weighted information and steps 202 and 204 of adding pilot channel signals to the beamforming results obtained using the weighted information.

Figure 14:
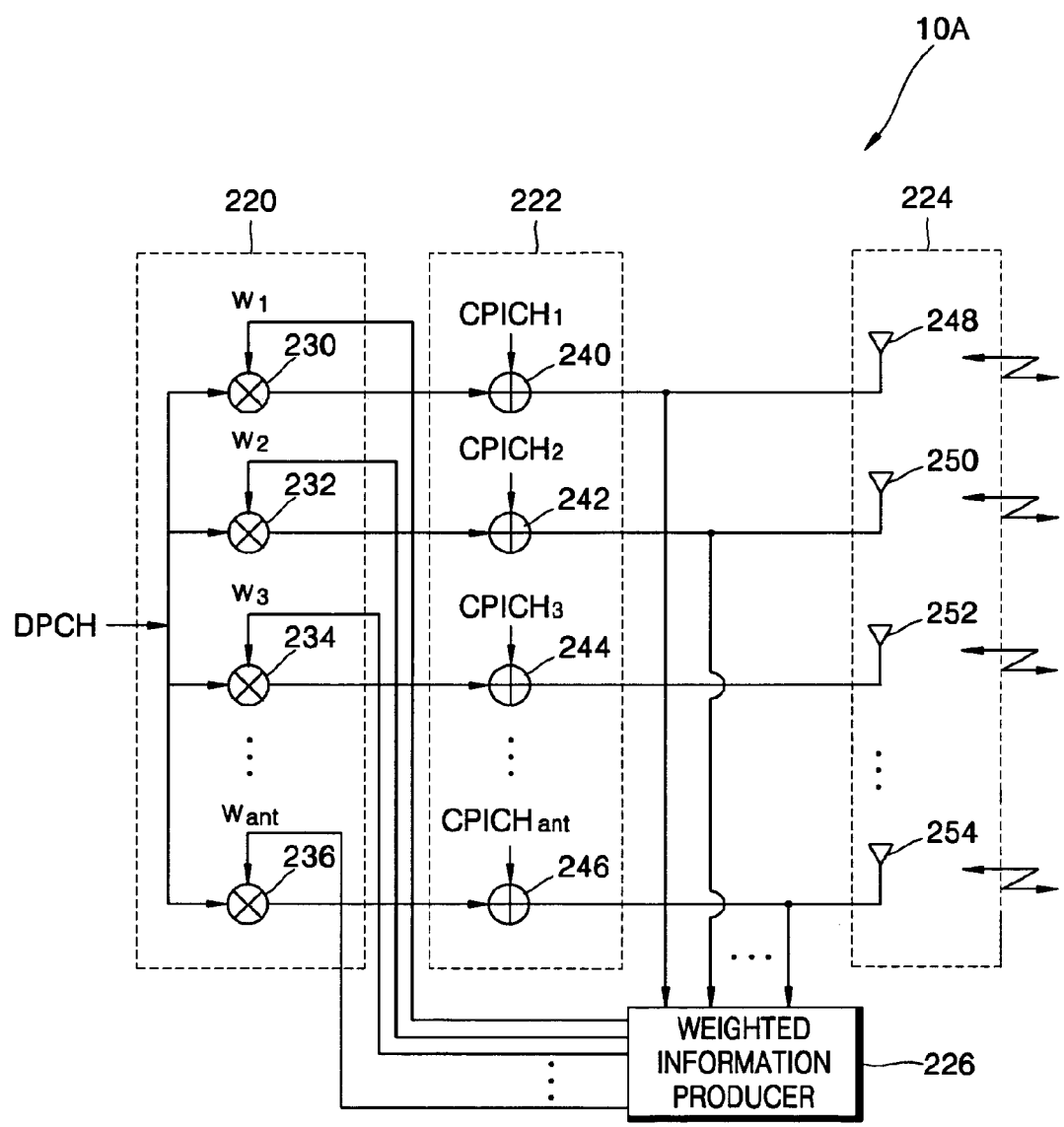
FIG. 14 is a block diagram of an embodiment of the present invention of the base station of FIG. 1.

FIG. 14 is a block diagram of a base station 10A, which is a preferred embodiment of the present invention of the base station 10 of FIG. 1. The base station 10A includes a first multiplier 220, a first adder 222, an antenna array 224, and a weighted information producer 226.

After step 30, the weighted information producer 226 receives a feedback signal transmitted from the k-th mobile station 20, 22, . . . , or 24, restores short-term information and physical space information from the received feedback signal, transforms the restored physical space information into approximate long-term information, and combines the approximate long-term information and the restored short-term information to produce weighted information, in step 200.

The antenna array 224 of FIG. 14 includes antennas 248, 250, 252, . . . , and 254, the number of which is ant. According to one embodiment of the present invention, each of the antennas 248, 250, 252, . . . , and 254 receives a feedback signal transmitted from the k-th mobile station 20, 22, . . . , or 24 of FIG. 1 and outputs the received feedback signal to the weighted information producer 226. According to another embodiment of the present invention, instead of receiving the feedback signal via the antenna array 224 as shown in FIG. 14, the weighted information producer 226 may receive the feedback signal via extra reception antennas (not shown) not via the antenna array 224 of FIG. 14.

Preferred embodiments of the present invention of step 200 of FIG. 13 and the weighted information producer 226 of FIG. 14 will now be described with reference to attached drawings.

Figure 15:
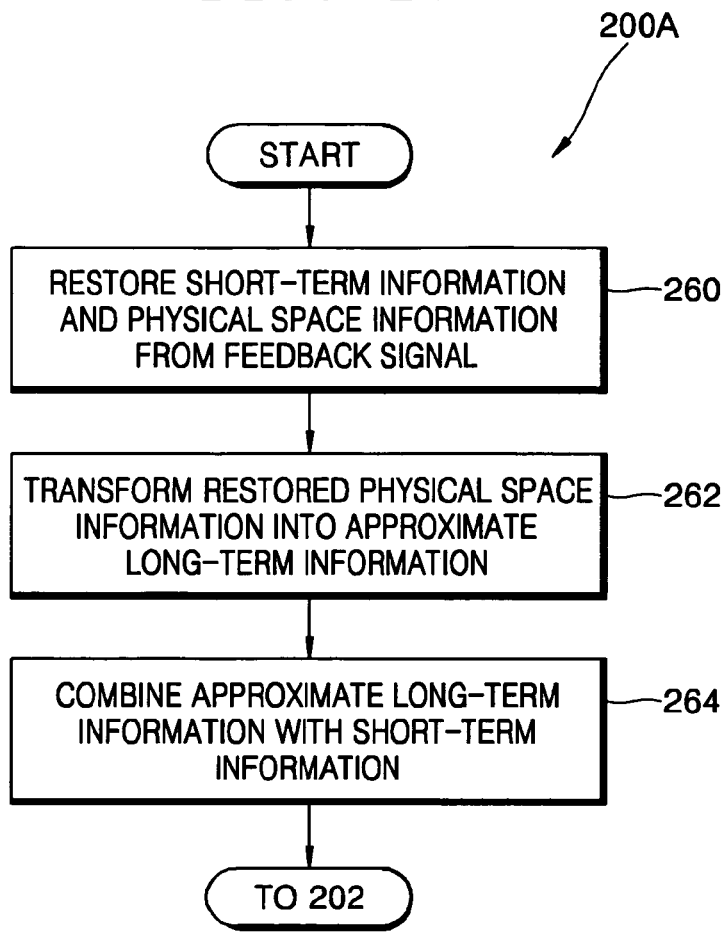
FIG. 15 is a flowchart for illustrating an embodiment of the present invention of step 200 of FIG. 13.

FIG. 15 is a flowchart for illustrating step 200A, which is a preferred embodiment of the present invention of step 200 of FIG. 13. Step 200A includes step 260 of restoring physical space information and a feedback signal and steps 262 and 264 of obtaining approximate long-term information and combining the same with the short-term information.

Figure 16:
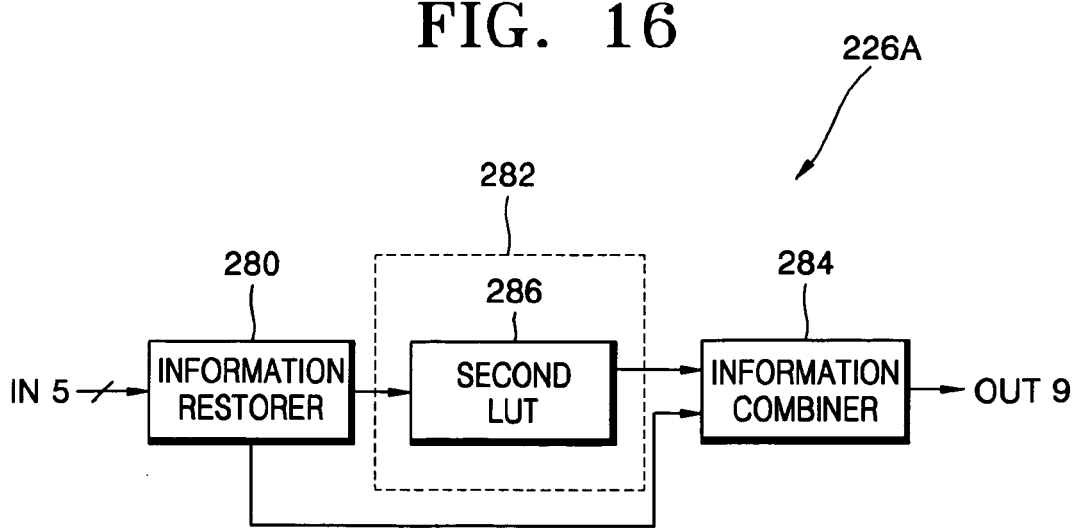
FIG. 16 is a block diagram of an embodiment of the present invention of the weighted information producer of FIG. 14.

FIG. 16 is a block diagram of a weighted information producer 226A, which is a preferred embodiment of the present invention of the weighted information producer 226 of FIG. 14. The weighted information producer 226A includes an information restorer 280, an information transformer 282, and an information combiner 284.

After step 30, the information restorer 280 restores short-term information and physical space information from the feedback signal received via the input terminal IN5 and outputs the restored short-term information to the information combiner 284 and the restored physical space information to the information transformer 282, in step 260.

After step 260, in step 262, the information transformer 282 transforms the restored physical space information received from the information restorer 280 into approximate long-term information and outputs the transformed approximate long-term information to the information combiner 284. To do this, the information transformer 282 can be implemented as a second LUT 286. The second LUT 286 receives the restored physical space information from the information restorer 280 to serve as an address, reads out approximate long-term information corresponding to the address, and outputs the read-out approximate long-term information to the information combiner 284. The outputs/inputs of the second LUT 286 correspond to inputs/outputs of the first LUT 86. For that, the first and second LUTs 86 and 286 are produced in advance using above-described Equations 1 and 2 by a mobile communication apparatus. In other words, the second LUT 286 uses the physical space information restored by the information restorer 280 as an address and reads out approximate long-term information corresponding to the address.

After step 262, the information combiner 284 combines the transformed approximate long-term information received from the information transformer 282 with short-term information restored by the information restorer 280 and outputs the combination result as weighted information to the first multiplier 220 via an output terminal OUT9, in step 264.

Embodiments of the present invention of step 264 of FIG. 15 and the information combiner 284 of FIG. 16 will now be described with reference to attached drawings.

FIG. 17 is a flowchart for illustrating step 264A, which is a preferred embodiment of the present invention of step 264 of FIG. 15. Step 264A includes step 300 of multiplying approximate effective eigenvectors by predetermined weighted constants and step 302 of summing the results of the multiplications.

FIG. 18 is a block diagram of an information combiner 284A, which is a preferred embodiment of the present invention of the information combiner 284 of FIG. 16. The information combiner 284A includes a second multiplier 310 and a second adder 312.

After step 262, the second multiplier 310 multiplies approximate effective eigenvectors $\tilde{v}_1, \tilde{v}_2, \ldots,$ and $\tilde{v}_{N_B}$, which correspond to the approximate long-term information transformed by the information transformer 282, by the restored predetermined weighted constants $\tilde{a}_1, \tilde{a}_2, \ldots,$ and $\tilde{a}N_{N_B}$, which correspond to the short-term information restored by the information restorer 280, and outputs the results of the multiplications to the second adder 312, in step 300. Here, the predetermined weighted constants $\tilde{a}_1, \tilde{a}_2, \ldots,$ and $\tilde{a}N_{N_B}$, are the results of restoration executed on predetermined weighted constants $a_1, a_2, \ldots,$ and $a_{NB}$. To perform step 300, the second multiplier 310 can be comprised of $N_B$ multiplication units 320, 322, ..., and 324, which multiply the approximate effective eigenvectors $\tilde{v}_1, \tilde{v}_2, \ldots,$ and $\tilde{v}_{N_B}$ and the restored weighted constants $\tilde{a}_1, \tilde{a}_2, \ldots,$ and $\tilde{a}_{N_B}$.

After step 300, in step 302, the second adder 312 adds the results of the multiplications executed in the second multiplier 310, determines the results of the addition as weighted information, and outputs the determined weighted information via an output terminal OUT10 to the first multiplier 220.

After step 200, the first multiplier 220 multiplies a Dedicated Physical CHannel signal (DPCH) by the weighted information received from the weighted information producer 226 and outputs the result of the multiplication as the results of beamforming to the first adder 222, in step 202. To perform step 202, the first multiplier 220 includes multiplication units 230, 232, 234, ..., and 236, the number of which is ant. The multiplication units 230, 232, 234, ..., and 236 multiply weighted values $w_1, w_2, w_3, \ldots,$ and $w_{ant}$, which are included in the weighted information received from the weighted information producer 226, by the Dedicated Physical CHannel signal (DPCH).

After step 202, the first adder 222 adds pilot channel signals to the beamforming results received from the first multiplier 220 and outputs the results of the additions to the antenna array 224, in step 204. To perform step 204, the first adder 222 can include addition units 240, 242, 244, ..., and 246, the number of which is ant. The addition units 240, 242, 244, ..., and 246 add the pilot channel signals to the results of the multiplications executed by the ant multipliers 230, 232, 234, ..., and 236. Here, the pilot channel signals $[P_i(k)]$ ($1 \leq i \leq ant$) are Common PIlot CHannel signals (CPICH) as shown in FIG. 14. However, the pilot channel signals may be Dedicated CPICH (DCPICH) signals or secondary CPICH (SCPICH) signals unlike FIG. 14. For example, if the pilot channel signals $[P_i(k)]$ are Common Pilot CHannel signals (CPICH), $P_i(k)$ is $CPICH_i$.

Each of the antennas 248, 250, 252, ..., and 254 of the antenna array 224 transmits the results of the addition performed by the corresponding addition unit among the addition units 240, 242, 244, ..., and 246 of the first adder 222 to the k-th mobile station 20, 22, ..., or 24 of FIG. 1.

As described above, each of the antennas 248, 250, 252, ..., and 254 of the antenna array 224 can both play the role of signal-transmission of transmitting the results of the addition performed by the addition unit 240, 242, 244, ..., or 246 and the role of signal-reception of receiving a feedback signal transmitted from the k-th mobile station 20, 22, ..., or 24.

Alternatively, each of the antennas 248, 250, 252, ..., and 254 of the antenna array 224 may only transmit the results of the additions performed by the addition units 240, 242, 244, ..., and 246. In this case, extra antennas for receiving a feedback signal transmitted from the k-th mobile station 20, 22, ..., or 24 are included in the base station 10.

To sum up, in a mobile communication apparatus and a mobile communication method according to the present invention, the k-th mobile station 20, 22, ..., or 24 feeds physical space information instead of long-term information back to the base station 10. Thus, the amount of feedback information is reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile communication apparatus having a mobile station and a base station including an antenna array, the mobile communication apparatus comprising:
   the mobile station measuring downlink characteristics of a channel of individual antennas from a signal received from the base station, detecting physical space information and approximate long-term information from the measured downlink characteristics, producing short-term information from the approximate long-term information and the downlink characteristics, transforming the short-term information and the physical space information into a feedback signal, and transmitting the feedback signal to the base station; and
   the base station receiving the feedback signal, extracting weighted information from the short-term information and the physical space information, which are restored from the received feedback signal, beamforming a dedicated physical channel signal using the weighted information, combining pilot channel signals with the result of the beamforming, and transmitting the results of the combinations to the mobile station via the antenna array,
   wherein the physical space information denotes space information about the location of the mobile station with respect to the base station, and the approximate long-term information denotes long-term information that is the most similar to long-term information in which the correlation characteristics of a channel of individual antennas are reflected.

2. The mobile communication apparatus of claim 1, wherein the mobile station comprises:
   a channel characteristics measurer receiving a signal transmitted from the base station, measuring the downlink characteristics from the received signal, and outputting the measured downlink characteristics;

a long-term space information producer producing the approximate long-term information and the physical space information from the downlink characteristics;

a short-term information producer producing the short-term information from the downlink characteristics and the approximate long-term information; and a mobile station signal transformer transforming the produced short-term information and the produced physical space information into the feedback signal.

3. The mobile communication apparatus of claim 2, wherein the mobile station further comprises a long-term information determiner which produces eigenvectors from the measured downlink characteristics, selects effective eigenvectors from the produced eigenvectors, determines the selected effective eigenvectors as the long-term information, and outputs the determined long-term information, and the long-term space information producer detects the physical space information from the long-term information and produces the approximate long-term information.

4. The mobile communication apparatus of claim 3, wherein the long-term space information producer comprises:

an address producer detecting the approximate long-term information, which is the long-term information, and producing an address corresponding to the approximate long-term information; and a first look up table reading out the physical space information corresponding to the address.

5. The mobile communication apparatus of claim 4, wherein the address producer comprises:

a distance calculator applying a norm to the differences between each of at least one effective eigenvector and predetermined effective eigenvectors, squaring the norms, and outputting the squaring results as inter-vector distances; and a maximum value searcher determining for each of the effective eigenvectors, as the address, the order of the greatest inter-vector distance among the inter-vector distances, outputting the address to the first lookup table, and outputting, as the approximate long-term information, a predetermined effective eigenvector corresponding to the greatest inter-vector distance.

6. The mobile communication apparatus of claim 4, wherein the predetermined effective eigenvectors included in the first look up table are produced using the following equation:

$$[\lambda_1 v_1 \lambda_2 v_2 \ldots \lambda_{N_B} v_{N_B}] = EVD_{eff}(R(\theta,\phi))$$

wherein $EVD_{eff}$ denotes a function for searching for the effective eigenvector and eigenvalue from the results of eigen value decomposition, $\lambda_i$ denotes an eigenvalue, $v_j$ denotes an eigenvector, and R(,) denotes a channel correlation matrix that is produced using DOAs ($\theta$) and AS ($\phi$) corresponding to the physical space information using the following equation:

$$R(\theta, \phi) = \frac{1}{Q+1} \sum_{q=-Q/2}^{q=Q/2} a\left(\theta + \phi\frac{q}{Q}\right) a^H\left(\theta + \phi\frac{q}{Q}\right)$$

wherein a direction vector $a(\theta)$ is $[1 \; \exp(j\psi) \; \exp(j2\Psi) \ldots \exp(j(B-1)\Psi)]$, where $\Psi = \pi \sin(\theta)$.

7. The mobile communication apparatus of claim 2, wherein the short-term information producer comprises:

a basisvector combiner combines all predetermined weighted constants with the approximate long-term information received from the long-term space information producer and outputting the results of the combinations as weighted vectors;

a reception power calculator multiplying each of the weighted vectors received from the basisvector combiner by the downlink characteristics received from the channel characteristics measurer, applying a square of norm to each of the multiplication results, and outputting reception power, which corresponds to the results of the squaring; and a maximum power detector detecting as the maximum reception power the greatest value from the reception power values received from the reception power calculator and determining, as the short-term information, indices where coefficients used to obtain the weighted value used to calculate the maximum reception power are located.

8. The mobile communication apparatus of claim 2, wherein the mobile station signal transformer comprises:

a physical space information formatter formatting the physical space information received from the long-term space information producer such that the physical space information can be fed back and outputting the formatted physical space information;

a mobile station short-term information formatter formatting the short-term information received from the short-term information producer and outputting the formatted short-term information; and a time division multiplexer performing time division multiplexing on the formatted physical space information received from the physical space information formatter and the formatted short-term information received from the mobile station short-term information formatter and outputting the time-division multiplexing result as the feedback signal, wherein the formatted physical space information received from the physical space information formatter is less frequently multiplexed than the formatted short-term information received from the mobile station short-term information formatter.

9. The mobile communication apparatus of claim 1, wherein the base station comprises:

a weighted information producer restoring the physical space information and the short-term information from the feedback signal, transforming the restored physical space information into the approximate long-term information, and producing the weighted information by combining the transformed approximate long-term information with the restored short-term information;

a first multiplier multiplying the weighted information by the dedicated physical channel signal and outputting the result of the multiplication as the beamforming result; and a first addition unit adding the pilot channel signals to the beamforming result and outputting the result of the addition as the combination result, wherein the results of the additions performed by the first adder are transmitted to the mobile station via the antenna array.

10. The mobile communication apparatus of claim 9, wherein the weighted information producer comprises:

an information restorer restoring the short-term information and the physical space information from the feedback signal;

an information transformer transforming the restored physical space information into the approximate long-term information; and an information combiner combining the transformed approximate long-term information with the restored short-term information and outputting the combination results as the weighted information.

11. The mobile communication apparatus of claim 10, wherein the information transformer comprises a second look up table reading out corresponding approximate long-term information by using the recovered physical space information as an address, wherein the inputs/outputs of the first look up table are the same as the outputs/inputs of the second look up table, respectively.

12. The mobile communication apparatus of claim 10, wherein the information combiner comprises:
a second multiplier multiplying each of effective eigenvectors, which are the transformed approximate long-term information, by each of recovered predetermined weighted constants, which are the restored short-term information, and outputting the results of the multiplications; and
a second adder adding the results of the multiplications performed in the second multiplier.

13. A mobile communication method performed in a mobile communication apparatus having a mobile station and a base station including an antenna array, the mobile communication method comprising:
(a) measuring the downlink characteristics of a channel of individual antennas form a signal received from the base station, detecting physical space information and approximate long-term information from the measured downlink characteristics, producing short-term information using the approximate long-term information and the downlink characteristics, transforming the determined the short-term information and the physical space information into a feedback signal, and transmitting the feedback signal to the base station; and
(b) receiving the feedback signal, extracting weighted information from the short-term information and physical space information, which are restored from the received feedback signal, beamforming a dedicated physical channel signal using the weighted information, combining the beamforming result with pilot channel signals, and transmitting the results of the combinations to the mobile station via the antenna array,
wherein the physical space information denotes space information about the location of the mobile station with respect to the base station, and the approximate long-term information denotes long-term information that is the most similar to long-term information in which the correlation characteristics of a channel of individual antennas are reflected.

14. The mobile communication method of claim 13, wherein step (a) comprises:
(a1) receiving a signal transmitted from the base station and measuring the downlink characteristics from the received signal;
(a2) producing the approximate long-term information and the physical space information from the downlink characteristics;
(a3) producing the short-term information using the downlink characteristics and the approximate long-term information; and (a4) transforming the produced short-term information and the produced physical space information into the feedback signal.

15. The mobile communication method of claim 14, wherein step (a) further comprises step (a5) producing eigenvectors from the measured downlink characteristics, selects effective eigenvectors from the produced eigenvectors and determines the selected effective eigenvectors as the long-term information, wherein in step (a3), the physical space information and the approximate long-term information are produced from the long-term information.

16. The mobile communication method of claim 15, wherein step (a3) comprises:
(a31) detecting the approximate long-term information, which is the long-term information, and producing an address corresponding to the approximate long-term information; and
(a32) reading out the physical space information stored in the produced address.

17. The mobile communication method of claim 16, wherein step (a31) comprises:
applying norm to the differences between each of at least one effective eigenvector, which is the determined long-term information, and predetermined effective eigenvectors and squaring the norms to obtain inter-vector distances; and
determining, for each of the effective eigenvectors, which are the determined long-term information, as the address, the order of the greatest inter-vector distance among the inter-vector distances, determining, as the approximate long-term information, a predetermined effective eigenvector corresponding to the greatest inter-eigen distance, and proceeding to step (a32).

18. The mobile communication method of claim 14, wherein step (a3) comprises:
combining all predetermined weighted constants with the approximate long-term information and determining the results of the combinations as weighted vectors;
multiplying each of the weighted vectors by the downlink characteristics and applying a square of norm to the multiplication result to obtain reception power values; and
detecting as the maximum reception power the greatest value from the reception power values and determining, as the short-term information, indices where coefficients used to obtain the weighted value used to calculate the maximum reception power are located.

19. The mobile communication method of claim 13, wherein step (b) comprises:
(b1) restoring the physical space information and the short-term information from the feedback signal, transforming the restored physical space information into the approximate long-term information, and producing the weighted information by combining the transformed approximate long-term information with the restored short-term information;
(b2) multiplying the weighted information by the dedicated physical channel signal and determining the result of the multiplication as the beamforming results; and
(b3) adding the pilot channel signals to the beamforming result and outputting the result of the addition as the combination result,
wherein the results of the additions are transmitted to the mobile station via the antenna array.

20. The mobile communication method of claim 19, wherein step (b1) comprises:
- (b11) restoring the short-term information and the physical space information from the feedback signal;
- (b12) transforming the restored physical space information into the approximate long-term information; and
- (b13) combining the transformed approximate long-term information with the restored short-term information and determining the combination result as the weighted information.

21. The mobile communication method of claim 20, wherein in step (b12), the corresponding approximate long-term information is read out by using the recovered physical space information as an address.

22. The mobile communication method of claim 20, wherein step (b13) comprises:

multiplying effective eigenvectors, which are the transformed approximate long-term information, by each of recovered predetermined weighted constants, which are the restored short-term information; and adding the results of the multiplications and determining the result of the addition as the weighted information.

23. The mobile communication method of claim 13, wherein the physical space information includes a direction of arrival (DOA) and an angle spread (AS).

* * * * *